(12) United States Patent
Besner et al.

(10) Patent No.: US 6,451,487 B1
(45) Date of Patent: Sep. 17, 2002

(54) COMPOSITE COATING LIPO3

(75) Inventors: Simon Besner, Coteau-du-Lac; Michel Armand, Montréal; Jean-François Magnan, Neuville; André Bélanger, Ste-Julie; Michel Gauthier, La Prairie; Elisabeth Dupuis, McMasterville, all of (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 09/545,094

(22) Filed: Apr. 7, 2000

(30) Foreign Application Priority Data

Apr. 7, 1999 (CA) .............................................. 2268316

(51) Int. Cl.[7] .................................................. H01H 4/02
(52) U.S. Cl. ........................................ 429/304; 429/324
(58) Field of Search ................................. 429/129, 137, 429/141, 142, 144, 131, 304, 306, 307, 324, 325

(56) References Cited

U.S. PATENT DOCUMENTS

| | | | |
|---|---|---|---|
| 5,580,686 A | 12/1996 | Shi et al. | 429/245 |
| 5,856,045 A | 1/1999 | Fauteux et al. | 429/232 |
| 5,910,382 A | 6/1999 | Goodenough et al. | 429/218.1 |

FOREIGN PATENT DOCUMENTS

WO     WO 97/44843     11/1997

*Primary Examiner*—Patrick Ryan
*Assistant Examiner*—M. Wills
(74) *Attorney, Agent, or Firm*—Oblon, Spivak, McClelland, Maier & Neustadt, P.C.

(57) ABSTRACT

The present invention concerns a composite electrode for an electrochemical cell, an electrochemical cell comprising the composite electrode, a process for preparing the composite electrode, and a process for the preparation of a half-cell comprising a porous mineral composite-porous mineral separator sub-network.

72 Claims, 7 Drawing Sheets

Example of composite electrode according to the invention

Composite electrode before cycling

Composite electrode after cycling illustrating possible zones where there may be formation of passivation films Example of mineral sub-assembly Example of composite electrode according to the invention

Figure 2 c

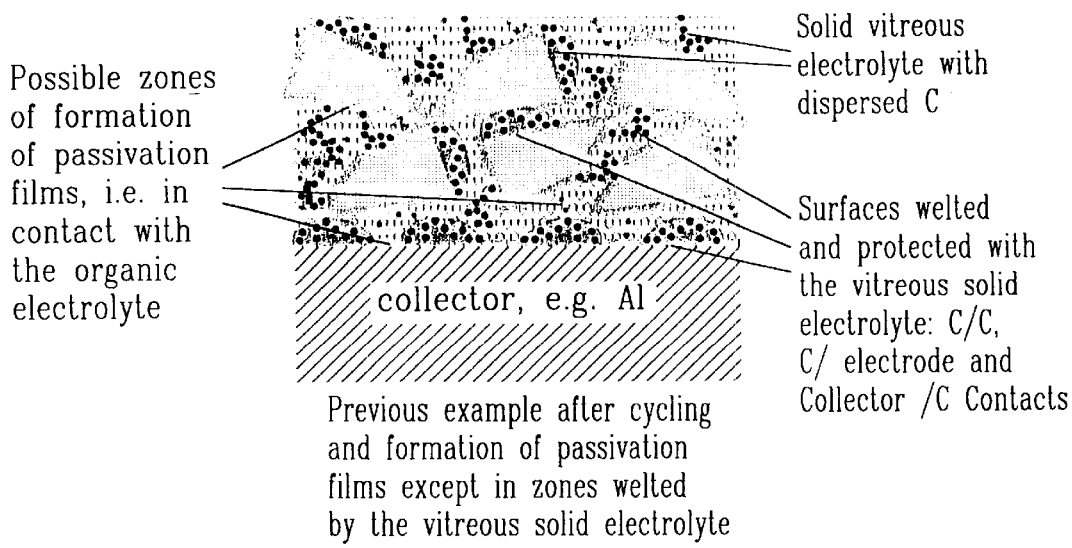

Possible zones of formation of passivation films, i.e. in contact with the organic electrolyte Solid vitreous electrolyte with dispersed C Surfaces welted and protected with the vitreous solid electrolyte: C/C, C/ electrode and Collector /C Contacts collector, e.g. Al Previous example after cycling and formation of passivation films except in zones welted by the vitreous solid electrolyte

Figure 2 d

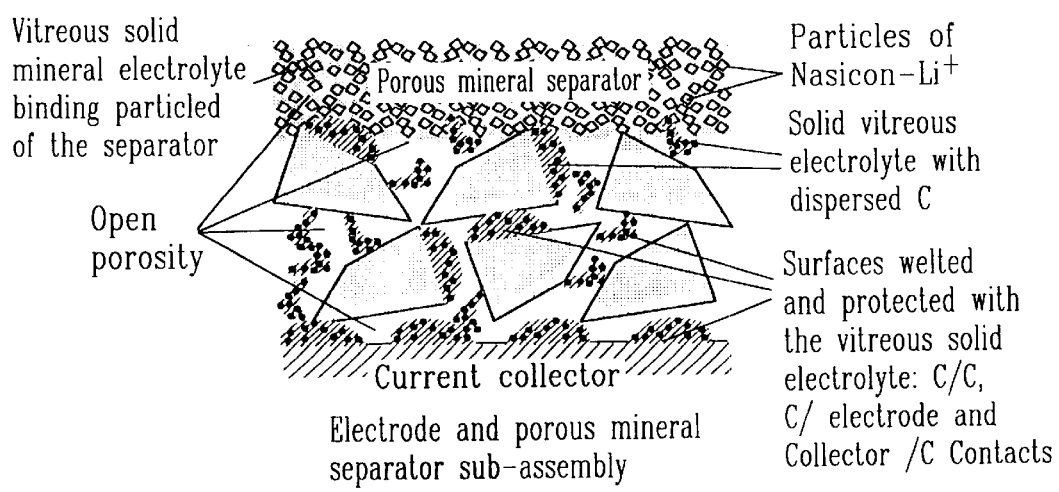

Vitreous solid mineral electrolyte binding particled of the separator

Porous mineral separator

Open porosity

Current collector

Electrode and porous mineral separator sub-assembly

Particles of Nasicon-Li$^+$

Solid vitreous electrolyte with dispersed C

Surfaces welted and protected with the vitreous solid electrolyte: C/C, C/ electrode and Collector /C Contacts

COMPOSITE COATING LIPO3

The present invention concerns a composite electrode for electrochemical cell, an electrochemical cell comprising the composite electrode, a process for preparing the composite electrode, as well as a process for the preparation of a half-cell comprising a porous mineral composite—porous mineral separator sub-network.

More particularly, the invention concerns a composite electrode in which two solid interpenetrated electrolytes are used. The first electrolyte, of organic nature, preferably consists of a dry or gelled polymer which is made conductive by dissolving a salt or a mixture of salts preferably containing a lithium ion, and which acts as a deformable binder of the composite. The second electrolyte, of mineral nature, preferably vitreous, is a specific ion conductor, such as lithium ions, and in which the components of the first polymer electrolyte are insoluble. The solid mineral electrolyte is prepared in the form of an aqueous solution or in a mixture of water and light alcohols, which is contacted with the materials of the electrode in dispersed form so as to moisten at least in part the solid phases of the composite, i.e. the particles of the active material of the electrode, the additive of electronic conduction as well as the current collector of the electrode on which the dispersion is applied so as to form first a porous mineral sub-assembly. The organic electrolyte preferably comprising a polymer is thereafter introduced by permeation (impregnation) in the porous mineral sub-assembly so as to constitute the composite electrode of the invention.

The use of inert binders for preparing composite electrodes with liquid electrolytes has been known to one skilled in the art for a number of years. With the development of intrinsic or gelled conductive polymer electrolytes, the electrolyte has also become the binder of the composite electrode, which has made it possible to more easily adapt the variations of volume of the materials of the electrode. (Armand Europe and Bellcore). The use of appreciable amounts of mineral binders of polysilicates type in composites to mechanically bind the materials of the electrode to their current collector in a system of lithium-ion type with liquid electrolyte has also been described, and the possibility to carry out about twenty cycles has been demonstrated (Fauteux U.S. Pat. No. 5,856,045). A process of manufacturing a composite electrode including a step of preparing a porous electrode on its collector under air and a step of impregnating components of a polymer electrolyte so as to compensate for the porosity has been described in WO 97/44843, without however mentioning the preferred moistening of the phases in presence.

The treatment of active electrode materials with mineral phases to reduce the chemical aggressiveness of the active powders towards the organic electrolytes was also described for cathodes of lithium-ion systems (Tarascon).

Accessorily, the protection of current collectors such as aluminum with carbon base coatings was the object of numerous Patents which proposed the use of organic type inert binders (Fauteux U.W. U.S. Pat. No. 5,580,686).

None of these solutions meet all the criteria enabling to ensure the preservation of performances in power or cycling capacity, such as under conditions of elevated temperature, for example with polymer electrolyte lithium generators operating at temperatures between 40 and 80° C., (JPS MG) or still with lithium-ion type generators operating at room temperature but under high voltages close to 4 volts (ref. lithiumion). In particular, none of the suggested solutions propose a global solution to the problem of preserving the quality of the ionic and electronic exchanges between all the phases constituting the composite electrode, such as between the dispersed solid particles. In the cases of extreme temperature and voltage, the collectors and the interfaces between the various solid phases, or between the particles of the same phase, are strongly solicited and have a tendency to prematurely lose their properties by formation of passivation films which are prejudicial to the quality of the electrical contacts inside the generator. Under these conditions, the components of the electrolytes (solvent and salt) play an important part in the formation of passivation films at the interfaces.

An advantageous way to maintain the quality of the electrical contacts in a generator would consist in using vitreous or crystalline solid mineral electrolytes which are in addition specific conductors of lithium ions. These solid electrolytes are less kinetically or thermodynamically reactive that organic liquids or polymers and do not require the use of a mobile lithium salt which can react with the active material of the electrode or with the current collector.

On the other hand, in vitreous state and when prepared in solution, these electrolytes have wetting properties which enable them to maintain at least part of the exchange surfaces during phenomena of passivation produced by a direct contact with the components of an organic electrolyte. These electrolytes however have disadvantages in that they are poor conductors and furthermore, they are rigid and brittle, i.e. they do not easily accommodate to variations of volume taking place at the electrodes during discharge/charge cycles. It is therefore difficult to use them as the only electrolyte of a composite and it is still more difficult to use them as binder of a composite which undergoes important variations of volume of the electrodes during cycling.

It is an object of the present invention to overcome these disadvantages by associating in a same composite electrode of a generator, the use of a solid mineral electrolyte with a solid organic electrolyte, preferably a polymer electrolyte.

It is another object of the invention to use first a solid mineral electrolyte, preferably vitreous or partially vitreous, in aqueous solution, to wet and adhere to at least part of the surface of the phases in presence: current collector, active material of the electrode and to at least part of the additive of electronic conduction.

It is also an object of the invention to provide a preparation step which defines impervious contact zones between the vitreous electrolyte and each of the solid phases.

It is also an object of the invention to disperse the active material of the electrode and the additive of electronic conduction in a aqueous phase comprising the solid vitreous electrolyte in solution and to apply same on the current collector so as to constitute a porous mineral subassembly.

It is also an object of the invention to provide a process which consists in impregnating a solid organic polymer electrolyte and a lithium salt both present in the form of molten polymer, polymer solution or still in the form of polymer which will be cross-linked after formation, so as to constitute a composite electrode with two solid electrolytes, one in the form of mineral glass, the other in the form of organic elastomeric polymer.

Another object of the invention resides in the use of the vitreous solid electrolyte to wet at least part of the surface of the solid phases in presence so as to cause these contact surfaces (entirely mineral) to be inaccessible to the components of the organic solid electrolyte (polymer and lithium salt) and thus to preserve this portion of the surface from the formation of passivation films which are harmful to the quality of electrical contacts.

It is still another object of the invention to optimize the electrochemical performances of at least one composite electrode of a rechargeable lithium generator when this generator operates under difficult conditions of temperature or high voltages and for long periods of time.

It is still another object of the invention to combine into one single composite electrode the advantageous properties of a solid mineral electrolyte with the complementary properties associated with solid polymer electrolytes.

Another object of the invention is to cause the vitreous solid mineral electrolyte to wet at least part of the solid phases so as to protect the zones thus coated, from corrosion and passivation phenomena resulting from an extended contact with the components of the organic electrolyte and thus to protect the quality of the electrical contacts between the different phases, such as with respect to ionic and electronic exchanges required for the performances of the generator.

Another object of the invention is to cause the organic polymer electrolyte to provide a higher level of conductivity as well as adjustable mechanical properties such as adhesiveness and a capacity of deformation which is essential as a binder which is capable of adjustment to volumic variations of the materials of the electrode during cycling.

Finally, it is another object of the invention to produce a composite electrode which is particularly useful for lithium metal dry polymer type generators operating under hot conditions between 40 and 125° C. or for lithium ion type generators in which the voltages at the end of the recharge period are often higher than 4 Volts.

The invention concerns a composite electrode of an electrochemical cell, the latter including a second electrode and at least one electrolyte acting as separator, and disposed between the composite electrode and the second electrode. The composite electrode comprises a current collector, dispersed particles of electrochemically active material, possibly a first additive of electronic conduction and at least two solid electrolytes, namely a first electrolyte of mineral nature which is at least partly vitreous, and a second electrolyte of organic nature of polymer electrolyte type. The composite electrode is characterized in that the electrolyte of mineral nature at least partly wets the surfaces of the active material dispersed in the composite electrode, of the conduction additive found therein as well as of the current collector so as to constitute a porous mineral sub-assembly. This surface, which is partly wetted, is thus protected by means of an impervious mineral phase, and the second electrolyte of organic nature of polymer electrolyte type is in close contact with the porous mineral sub-assembly so as to ensure ionic exchanges within the composite electrode and with the other components of the cell. The second electrolyte of organic nature of polymer electrolyte type additionally acts as deformable binder of the assembly consisting of the composite electrode, its collector and the separator of the cell, and possibly comprises a second additive of electronic conduction in dispersed form enabling to optimize electronic exchanges within the composite electrode and it current collector, the composite electrode including at least two solid electrolytes, thus ensuring zones where at least part of the exchange surfaces between solid phases and the electrolyte of mineral nature at least partly vitreous is non accessible to the components of the electrolyte of organic nature of polymer electrolyte type and to contaminants which may originate from other components of the electrochemical cell and are less susceptible to form films of passivation or degradation, thereby ensuring electrical contacts of good quality within the composite electrode, in spite of difficult conditions of temperature, voltage or cycling.

The first additive of electronic conduction is preferably selected from carbon blacks, graphites, metallic powders, doped conjugated polymers, nitrides or carbides of transition metals. With respect to the second additive of electronic conduction, it may comprise carbon blacks and graphites. On the other hand, the electrolyte of mineral nature at least partly vitreous may be selected from the group consisting of phosphates or polyphosphates and borates or polyborates of an alkali metal, such as lithium or potassium, and mixtures thereof, which are conductors of alkaline ions.

The electrolyte of mineral nature may include glass forming elements for example those selected from silicas, siloxanes, completely or partially hydrolyzed aluminates and titanates.

The electrolyte of mineral nature consists for example of lithium phosphate of approximate stoichiometry $LiPO_3$, whose pH is between 4 and 9 et having a minimum conductivity of $10^{-10}$ S.cm$^{-1}$ at the temperature of operation of the electrochemical cell. This lithium phosphate is prepared by fast neutralization of metaphosphoric acid in water solution with a lithium salt to give a pH between 4 and 9.

The electrochemical material which is present in the composite electrode is for example selected from oxides, chalcogenides and oxyanion derivatives of transition metals, and of lithium or mixtures thereof. For example, it is based on vanadium oxide, phosphates or phosphosulfates of olivine structure of transition metals comprising iron or manganese of Nasicons, such as iron phosphates of the type $LiFePO_4$ in discharged state.

The additive of electronic conduction may comprise carbons or graphites, it may be of metallic type, in dispersed form, for example silver, copper, or may be of semi-metallic type, in dispersed form, for example it may be selected from carbides, nitrides, borides of metals or doped conjugated polymers. The current collector may comprise aluminum or copper.

According to a preferred embodiment, the active material of the composite electrode is at a voltage higher than 1.6 volts with respect to that of metallic lithium and operates as an anode.

On the other hand, it is preferred but not essential that the volumic fraction of the electrolyte of mineral nature which is at least partly vitreous with respect to the dispersed phases of active material and additive of electronic conduction be comprised between 2 and 25% so as to permit an at least partial wetting of the dispersed solid phases, the formation of an open porosity of the mineral sub-assembly, and the adhesion of the electrolyte of mineral nature at least partly vitreous to the collector before introducing the electrolyte of organic nature of polymer electrolyte type. Moreover, the open porosity of the sub-assembly is preferably about 30 to 70%.

The electrolyte of organic nature of polymer electrolyte type preferably includes a soluble salt to make it conductive, for example a lithium salt.

According to another preferred embodiment, the electrolyte of organic nature of polymer electrolyte type mainly consists of a polyether including ethylene oxide units; or it may comprise a gel consisting of a polyether matrix or a polyelectrolyte, a liquid aprotic solvent and a soluble salt. It may also comprise a gel consisting of a non solvating polymer matrix, a liquid aprotic solvent and a soluble salt, for example the gel may consist of a non solvating polymer matrix, a solvent comprising an aprotic compound and a soluble lithium salt.

According to another embodiment, the electrolyte of organic nature of polymer electrolyte type is present within the electrolyte of mineral nature so as to constitute a deformable binder for the composite electrode.

The separator of the electrochemical cell according to the invention normally consists of a solvating or non solvating solid polymer electrolyte, or a polymer, an aprotic solvent and a dissociated lithium salt. The separator may also consist of a solid powder which is bound by an electrolyte of mineral nature which is at least partially vitreous according to the invention, which is impregnated with a liquid or polymeric electrolyte.

The invention also concerns a process for preparing a composite electrode of an electrochemical cell, including two locally distributed solid electrolytes, the first one of mineral nature at least partly vitreous, the second one of organic nature of polymer electrolyte type, as well as its collector. The process is characterized by preparing an aqueous solution of the first electrolyte or its precursor in which particles of electrode material and possibly an additive of conduction are dispersed, applying the dispersion obtained on a current collector and drying the dispersion so as to wet and at least partly coat the particles, the additive of electronic conduction and the current collector, and to constitute a porous mineral sub-assembly which is sufficiently adherent to the current collector to enable it to be handled in the form of a film, and thereafter possibly applying a dispersion of an additive of electronic conduction in an electrolyte of organic nature of polymer electrolyte type containing a lithium salt on the film of the porous mineral sub-assembly so as to completely or partly introduce within the porous mineral sub-assembly the electrolyte of organic nature of polymer type so that it acts as binder and mixed conductor inside the porous sub-assembly, thereby obtaining the composite electrode.

The particles of material include for example a first additive of electronic conduction also dispersed in the aqueous solution of the first electrolyte so as to give after evaporation, a mixed coating which is conductive towards lithium ions and electrons. The electrolyte of organic nature of polymer electrolyte type may be introduced into the porous mineral sub-assembly in molten form, as a solution in a solvent, or in the form of prepolymer or monomer of low molecular weight, which is cross-linked or polymerized after formation.

Preferably, the mineral electrolyte is at least partly vitreous and impervious to the components of the organic electrolyte of polymer electrolyte type, and is selected from phosphates and polyphosphates, borates and polyborates of an alkali metal such as lithium or potassium and mixtures thereof.

The organic electrolyte is preferably a solvating or non solvating polymer, or a non solvating polymer in gelled or non gelled form. It may also comprise a polar aprotic solvent, a dissolved lithium salt and a dispersed additive of electronic conduction, or it may mainly consist of a polyether including ethylene oxide units.

The invention also concerns a process for preparing a half-cell characterized by preparing an aqueous solution of a mineral electrolyte or its precursor, in which particles of an electrode material and an additive of electronic conduction are dispersed, applying the dispersion obtained on a current collector and drying the dispersion so as to wet and at least partly coat the particles and the current collector, and to constitute a porous mineral composite sub-assembly which is sufficiently adherent to the current collector to permit its handling in the form of film, preparing a dispersion of a mineral powder in another aqueous solution of the mineral electrolyte or its precursor and applying it on the porous mineral composite sub-assembly so as to constitute a porous half-cell including the collector, the mineral composite sub-assembly and a porous mineral separator, and applying a polymer electrolyte containing a lithium salt on the porous half-cell so as to completely or partly introduce the polymer electrolyte in all the porous components, the latter then serving as binder and conductor in the porous mineral composite—porous mineral separator composite sub-assembly, thus forming a half-cell with double solid electrolytes.

The mineral powder is preferably selected from insulating oxides and solids which are conductors of lithium ions, or Nasicons.

A half-cell may also be prepared by applying a polymer electrolyte separator on a composite electrode according to the invention, the polymer electrolyte being then loaded with mineral powders which are conductive or non conductive with respect to lithium ions.

The polymer electrolyte separator may be applied by hot pressing, in the form of a molten liquid phase, in dissolved form or as a prepolymer.

The invention also concerns a process of manufacturing an electrochemical cell characterized by assembling a composite electrode according to the invention with a separator as defined above, and adding a second electrode. In this case, the composite electrode is a cathode based on vanadium oxide or transition metal phosphate of olivine structure, in which the collector is aluminum, and the second electrode may be a lithium anode.

The invention will now be illustrated by means of the annexed drawings, given without limitation and in which FIG. 1a is an illustration of various types of interfaces in a composite electrode;

In rechargeable lithium generators, preserving the quality of the electrical, i.e. ionic and electronic, contacts between the different components is essential for an optimum performance in power and in cycling capacity, for example for demanding applications such as electrical or hybrid electrical vehicles.

The term quality of electronic contacts means the facility of electron exchange between the different constituting phases of the generator, such as between current collectors, additives of electronic conduction, generally carbon dispersed in the composite electrodes, as well as between the additives of electronic conduction and the particles of the active material of either of the electrodes.

Figure 1A:
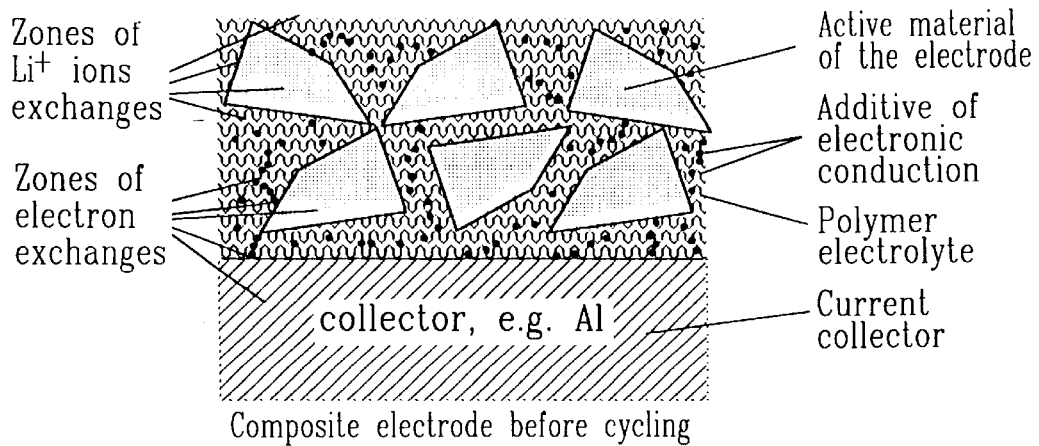
FIG. 1b is an illustration of the formation of passivation films in a composite electrode.

The term quality of ionic contacts means the facility of exchange of lithium ions (Li$^+$) at the interfaces between the different phases of the generator, such as, in the case of a composite electrode, between the surface of the particles of active materials with one another and with the mineral electrolyte which is dispersed in the composite as well as between the organic polymer electrolyte of the composite and that of the separator. These different types of interfaces are illustrated in FIG. 1a.

Generally, rechargeable lithium generators utilize organic electrolytes consisting of a polar aprotic solvent, which is in liquid or polymer form, or of a gel of a liquid solvent in a solvating or nonsolvating polymer and include a dissolved lithium salt which is more or less dissociated to ensure ionic conductivity. The strongly aggressive conditions to which the electrolyte and the components of the battery are locally subjected, e.g. oxidation at the cathode and reduction at the anode (reduction) often result in the formation of passivation films at the interfaces which tend to form passivation or degradation films and to limit ionic and electronic exchanges at the various interfaces.

Figure 1B:
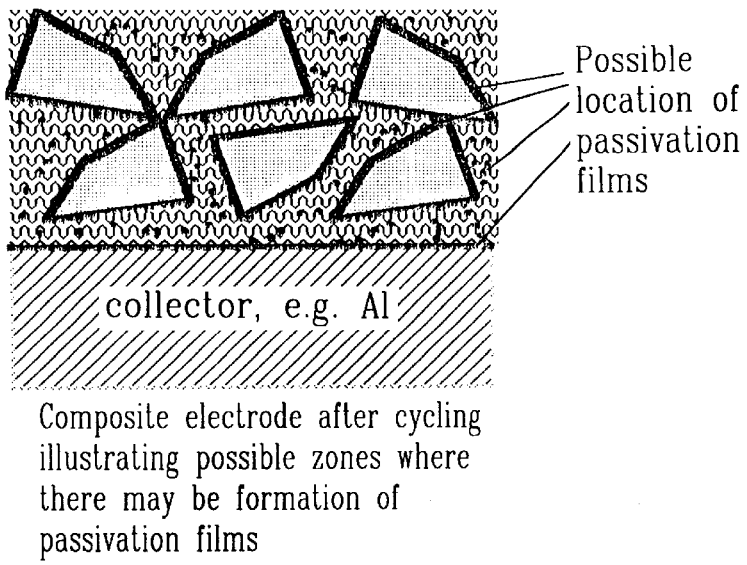

FIG. 1b illustrates, by way of example, the formation of some of these passivation films. The formation of these films will depend on the stability of the components of the organic electrolyte, polar aprotic solvent and lithium salt, towards the reactivity of the phases in presence (active material of the electrode) and the conditions of operation of the generator. With organic electrolytes, the formation of such films is a general phenomenon which increases as a function of time, temperature and the use of the generator and generally results in an increase of the over voltages at the interfaces and finally in a loss of capacity of the generator.

Another important characteristic of the organic electrolytes consisting of a solvent and a dissolved salt is the fact that it is a mixed conductor of the ions of the salt: Li$^+$ and corresponding anion, and therefore it has a lithium transport number lower than one in spite of a conductivity level which is apparently sufficient. This peculiarity results in the formation of salt gradients during the operation of the generator which accelerates aging phenomena during cycling. In counterpart, the use of solid polymer electrolytes ensures the presence of a deformable binder whose interest is well established with respect to performances in cycling and in power.

An advantageous way of retaining the quality of electrical contacts in a generator would consist in utilizing vitreous or crystalline solid mineral electrolytes which are additionally specific conductors of lithium ions. These solid electrolytes are less kinetically or thermodynamically reactive than organic liquids or polymers and do not require the use of a mobile lithium salt which is capable of reacting with the active material of the electrode or with the current collector. On the other hand, in vitreous state and when prepared in solution, these electrolytes have wetting properties which enable them to preserve at least part of the exchange surfaces from passivation phenomena produced by direct contact with the components of an organic electrolyte. The disadvantages of these electrolytes are however that they are low conductors and especially that they are rigid and brittle, i.e. they do not easily adjust to variations of volume which take place at the electrodes during discharge/charge cycles. It is therefore difficult to use them as the only electrolyte of a composite and even more to use them as binder for a composite which undergoes important variations of volume of the electrodes during cycling.

The present invention aims at overcoming these disadvantages by associating in a same composite electrode of a generator, the use of a solid mineral electrolyte with a solid organic electrolyte, preferably a polymer electrolyte.

Figure 2:
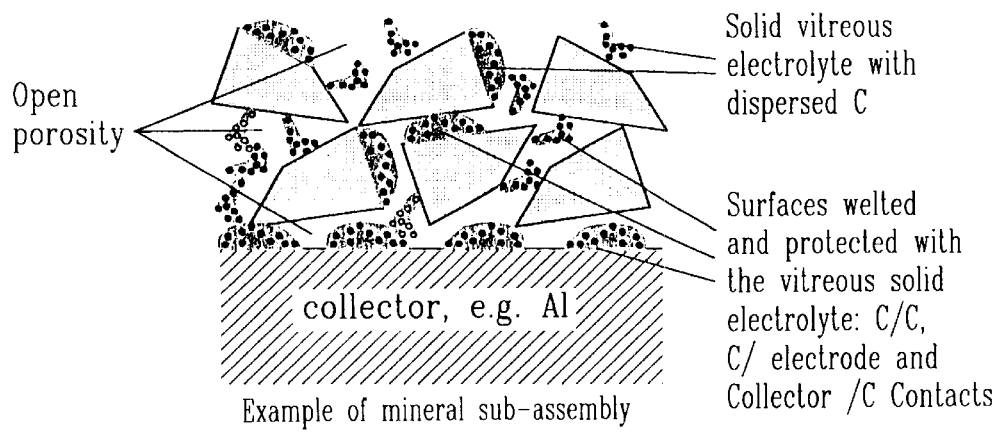
FIG. 2a illustrates a composite electrode according to the invention after the phase of depositing a vitreous electrolyte and drying of the assembly.
FIG. 2b illustrates a composite electrode according to the invention.
FIG. 2c illustrates a composite electrode according to the invention, after cycling.
FIG. 2d illustrates a composite electrode consisting of a mineral sub-assembly and a porous mineral separator.
Figure 2:
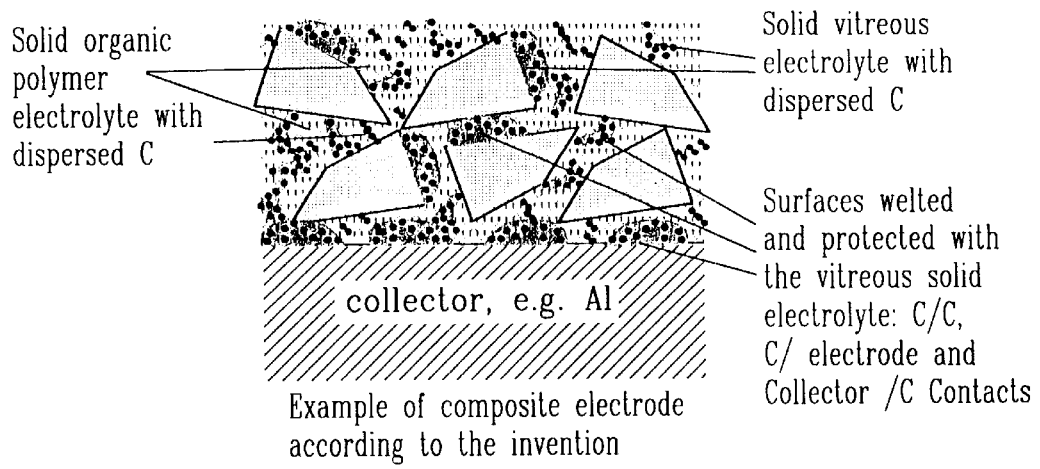

According to a preferred embodiment of the invention, first there will be used a solid mineral electrolyte, preferably vitreous or partly vitreous in aqueous solution, to wet and adhere to at least part of the surface of the phases in presence: current collector, active material of the electrode and at least part of the additive of electronic conduction. The purpose of this step of preparation is to define impervious contact zones between the vitreous electrolyte and each of the solid phases. This first phase of preparation of the composite electrode of the invention is illustrated in FIG. 2a after drying of the assembly.

An advantageous way of achieving this step consists in dispersing the active material of the electrode and the additive of electronic conduction in an aqueous phase comprising the vitreous solid electrolyte in solution and applying same on the current collector so as to constitute a porous mineral sub-assembly.

Secondly, this mineral sub-assembly is impregnated with an organic solid polymer electrolyte and a lithium salt which are in the form of molten polymer, of polymer solution or still in the form of prepolymer which will be cross-linked after formation, so as to constitute a composite electrode with two solid electrolytes, one in the form of mineral glass, the other in the form of elastomeric organic polymer.

A main characteristic of the invention is the use of the vitreous solid electrolyte to wet at least part of the surface of the solid phases in presence so as to render these contact surfaces (entirely mineral) nonaccessible to the components of the organic solid electrolyte (polymer and lithium salt) and thus to preserve this portion of the surface from the formation of passivation films which are harmful to the quality 5 of electrical contacts.

FIG. 2b illustrates by way of example the manner in which the invention ensures the quality of the electrical contacts within the composite. These examples are not limiting to the scope of the invention.

The chemical composition of the solid mineral electrolytes of the invention is selected so as to ensure an at least partially vitreous character which promotes the wetting of the solid phases, thereby ensuring an elevated specific conductivity of the lithium ions in solid state, and especially ensuring a chemical compatibility of the solid electrolyte with the active materials of the electrode of the invention, such as when the cathode is selected among vanadium oxides such V$_2$O$_5$, transition metal phosphates of olivine structure such as LiPO$_4$, or Nasicons. The compatibility criterion is to prevent a chemical reaction leading to a destruction of the material of the electrode, e.g. V$_2$O$_5$ (acid) with a polysilicate (basic) or to the formation of a surface reaction which is harmful to the quality of the electrical contacts. In the present invention, vitreous solid electrolytes which have a basic or acid character which is not too strong, are preferred. Phosphates and polyphosphates of the type LiPO$_3$ or berates and polyborates or mixtures thereof show particularly advantageous characteristics with respect to chemical compatibility, however they do not constitute a limitation of the invention in as much as their use and the criteria of good operation of the mineral electrolyte are respected. Additives promoting the formation of glass well known to the man of the art are included in the present invention as additives of solid mineral electrolytes mentioned in as much as they respect the criteria of chemical compatibility with materials of the electrodes, such as those having a acid character such as vanadium oxides. The use of glass compositions utilizing potassium is also included in this invention in as much as potassium is exchanged with lithium and does not interfere with the operation of many types of lithium generators (reference to potassium patent YC).

In use the invention will optimize the volumic fraction of the vitreous electrolyte with respect to the volumic fractions of the dispersed phases of active material of the electrode and of the additive of electronic conduction so as to protect the quality of the electrical contacts on at least part of the surface of the phases in presence, in a way to ensure a sufficient open porosity to provide for the penetration of the solid polymer electrolyte during impregnation. In general, a volumic ratio of the solid mineral electrolyte between 2 and 25% with respect to the whole of the volume occupied by each of the dispersed mineral solid phases will be preferred. More particularly, a ratio favoring an important open porosity permitting the impregnation of the solid polymer electrolyte, will be sought, such as between 30 and 70%. An optimization of the volumic fraction of the vitreous solid electrolyte within the ranges indicated will have the advantage of limiting the thickness of the protective layer of the solid electrolyte which is present at the surface of the particles of active material, which is relatively less conductive of lithium ions, so as to facilitate ionic exchanges in the whole composite electrode, the solid polymer electrolyte then being used for the transport of ions towards or originating from the separator and the counter electrode. Reference will be made to FIGS. 2a and b for an illustration of these embodiments.

With respect to the solid polymer electrolyte, the porosity of the mineral sub-assembly will be optimize so that the polymer electrolyte occupies a volumic fraction of about 50% so as to permit the transport of ions in the composite and enabling the polymer electrolyte to act as important deformable binder for the preservation of the performances during cycling in spite of local variations of volume of the electrode during consecutive cycles. Optionally, the solid polymer electrolyte with elastomeric property also comprises a dispersion of the additive of electronic conduction, so as to optimize the quality of the electronic contacts within the composite electrode, in spite of local variations of volume caused by the reaction at the electrode.

According to another optimized embodiment of the invention, an operation of mechanical compacting of the mineral sub assembly will be carried out so as to optimize the energetic content of the composite electrode before carrying out an operation of impregnation of the solid organic polymer electrolyte. One skilled in the art will realize that this operation may, if needed, comprise the addition of a low percentage (smaller than a few percent) of a soluble organic binder during the production of the mineral sub-assembly, so as to maintain the mechanical integrity of the sub-assembly during its compacting before its impregnation.

Figure 3:
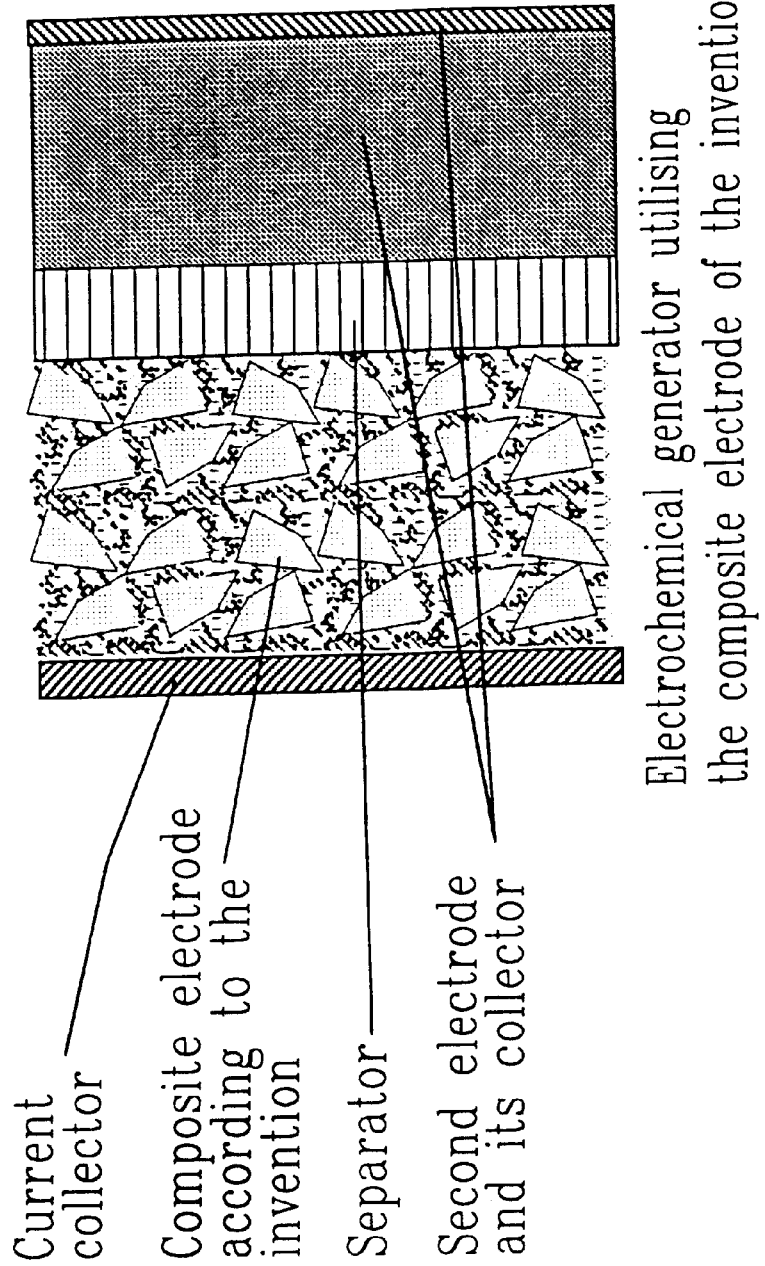
FIG. 3 illustrates a generator including a composite electrode according to the invention.

FIG. 3 describes a generator comprising one of the electrodes prepared according to the invention.

According to another embodiment of the invention, the mineral sub-assembly described previously will be used to carry out the application of a second mineral layer consisting of a solid mineral charge, which is conductive or non conductive of lithium ions, and which is suspended in its aqueous solution of the vitreous electrolyte so as to superimpose a precursor of the solid separator over the composite electrode, such as described in FIG. 3.

The mineral half-cell consisting of the collector, the mineral sub-assembly of the composite electrode and the solid precursor of the mineral separator is thereafter impregnated with the second solid electrolyte, preferably of the organic and polymer type, accessorily of liquid organic type. The non conductive solid mineral charge could consist of any solid electronically insulating material which is compatible with the other components of the generator. The solid mineral charge which is conductive towards $Li^+$ ions could be any solid material enabling a transport of $Li^+$ ions either within its mass, or at the surface thereof, structures of Nasicons type of sizes varying between 0.1 and $5\mu$ constituting an example of applicable solid charges.

Other characteristics and advantages of the invention will appear from the examples which follow, obviously given without limitation.

EXAMPLES

Example 1

In this example, an aqueous solution of a vitreous solid mineral electrolyte of general formulation $(LiPO_3)$ is prepared in the following manner. An aqueous solution of $(LiPO_3)_n$ is prepared by dissolving 75 g of polymetaphosphoric acid $((HPO_3)_n)$ in 325 g of water and is thereafter partly or completely neutralized by adding lithium hydroxide monohydrate $(LiOH.H_2O)$. in a molar ratio $(HPO_3)_n/LiOH$ of 1, corresponding to the addition of 39.6 g of $LiOH.H_2O$.

The aqueous solution of this vitreous electrolyte is coated by means of a template, on an aluminum collector without any additive of conduction being present in the vitreous coating. The solid vitreous electrolyte obtained after drying under vacuum at 150° C. has a thickness of 2 micrometers ($\mu$). The latter sheet is then mounted in an electrochemical cell 4 cm$^2$ consisting of the following elements. On the assembly collector/solid electrolyte based on $(LiPO_3)_n$, there is placed, by a process of heat transfer, a thin film about 15 microns consisting of a polymer electrolyte based on ethylene oxide containing the lithium salt LiTFSI at a concentration corresponding to a molar ratio O/Li of 30/1. This system is thereafter mounted to face a lithium anode by a process of heat transfer. It will be concluded that the resistive component of the solid vitreous electrolyte is of the order of $10^{-9}$ S.cm.$^{-1}$ at 25° C. This last result establishes that the $(LiPO_3)_n$ based coating permits the transport of lithium ions on short distances, the glasses being on the other hand known as specific conductors of metallic cations.

Example 2

In this example, the compatibility of the solid vitreous electrolyte of the invention with acid oxides, will be verified.

A dispersion consisting of 0.25 g of $V_2O_5$ is strongly stirred with 100 ml of an aqueous solution of $(LiPO_3)_n$ prepared according to example 1. The dispersion thus prepared has an orange color typical of $V_2O_5$. This observation establishes the chemical stability of the neutral aqueous solution of the solid electrolyte of type $(MPO_3)_n$ where M is Li or K with electrode materials of acid character represented by $V_2O_5$. An identical solution containing a base excess (LiOH) results in causing the solution to turn greenish. A green color is probably associated with a reduced state of vanadium resulting from a possible decomposition of water in basic medium. Such an observation is also noted with $V_2O_5$ when the treatment is carried with sodium silicate. The green color is interpreted by the basic effect of alkali metal silicates and their incompatibility with oxides of acid character such as $V_2O_5$.

Example 3

Figure 4:
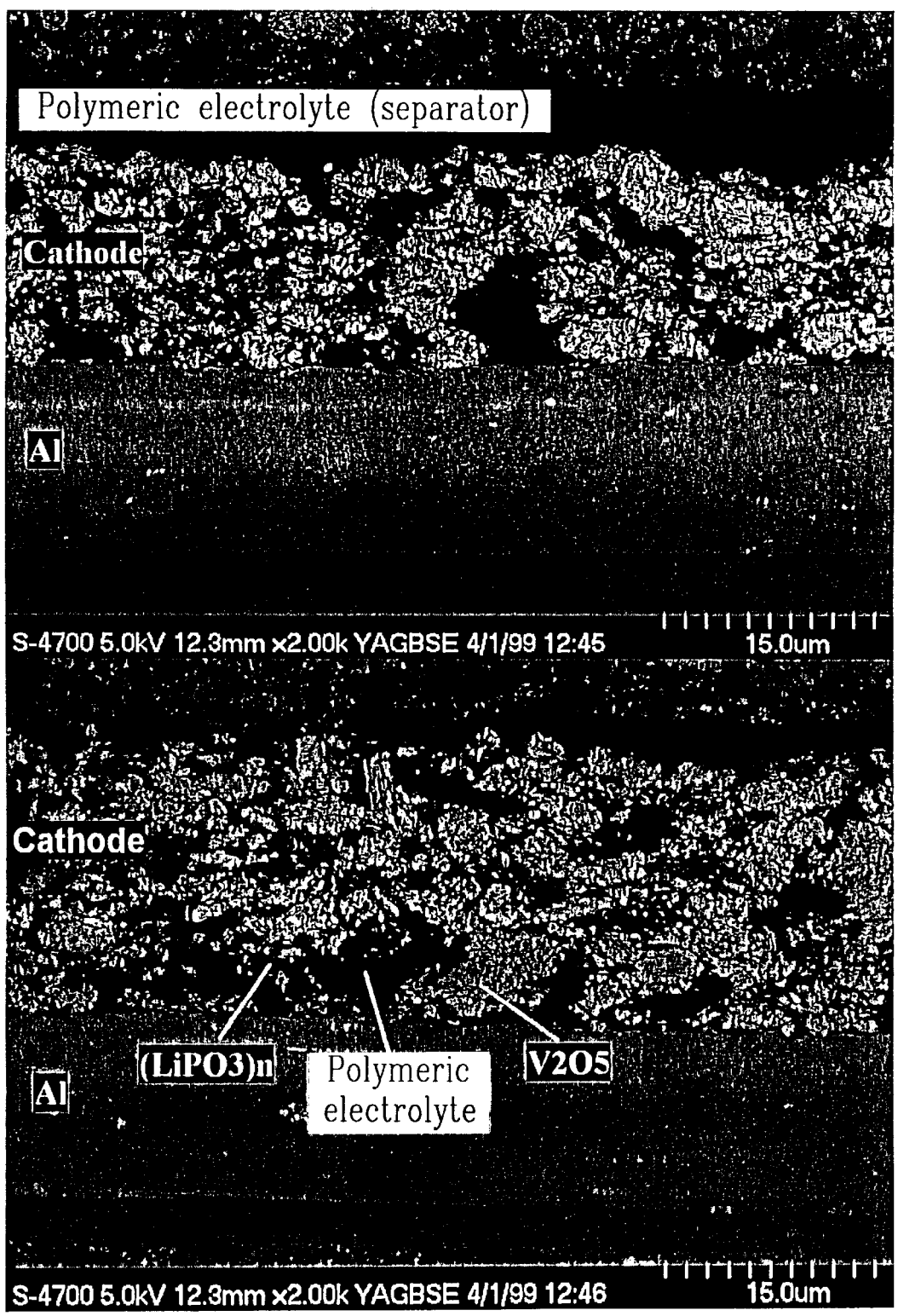
FIG. 4 is a micrograph of a composite electrode with double solid electrolytes described in example 3 according to the invention.

In this example, there is illustrated with micrographies with electronic scanning the appearance of a composite cathode obtained after coating an aluminum collector with a dispersion of oxide and carbon black from an aqueous solution of the vitreous mineral electrolyte followed by filling of the residual porosity with a solid polymer electrolyte thus forming a composite cathode with double solid electrolyte (FIG. 4).

The composite cathode with double solid electrolyte is prepared in the following manner. 183 g of an aqueous solution containing 18% by weight of $((LiPO_3)_n)$, is strongly mixed with 253.5 g of an aqueous dispersion of conductive carbon black (Ketjenblack EC-600) containing 5% by weight of carbon black. Then, 210.9 g of vanadium oxide $V_2O_5$ is added and dispersed. This dispersion is coated with a template on an aluminum collector about 15 microns thick. The ratios of oxide, carbon black and lithium polymetaphosphate glass are selected so that a residual porosity of about 60% remains in the composite electrode after this first step. The film thus obtained, after drying at 150° C., adheres to its collector and can be handled without difficulty. In the present example, the thickness of the film obtained is 35 microns and the volumic composition of the dry film obtained consists of 77% $V_2O_5$, 25% $((LiPO_3)_n)$ and 8% carbon black. Part of this pre-electrode is then spreaded with a solution containing a copolymer having a molecular weight of about 50,000 g/mol, consisting for the greater part of ethylene oxide units, and also containing cross-linkable acrylate functions and propylene oxide monomers, with a lithium salt LiTFSI at a concentration corresponding to a molar ratio O/Li of 30. A liquid polar aprotic solvent such as acetonitrile is used to facilitate coating with a template and the penetration of the polymer in the porous electrode. Spreading enables to introduce the polymer electrolyte into the porosity of the mineral composite electrode so as to produce the composite electrode according to the invention. Drying under vacuum of the composite electrode enables not only to eliminate any residual solvent, but also a better penetration of the polymer electrolyte. Filling of the porosity with the polymer electrolyte is still more efficient if drying under vacuum is carried out at higher temperature. Optionally, this operation of spreading also enables to constitute in whole or in part the separator of the generator in as much as an excess of polymer is coated. A micrography of a composite cathode including a double solid electrolyte and an excess of electrolyte acting as separator is illustrated in FIG. 4.

Example 4

Figure 5:
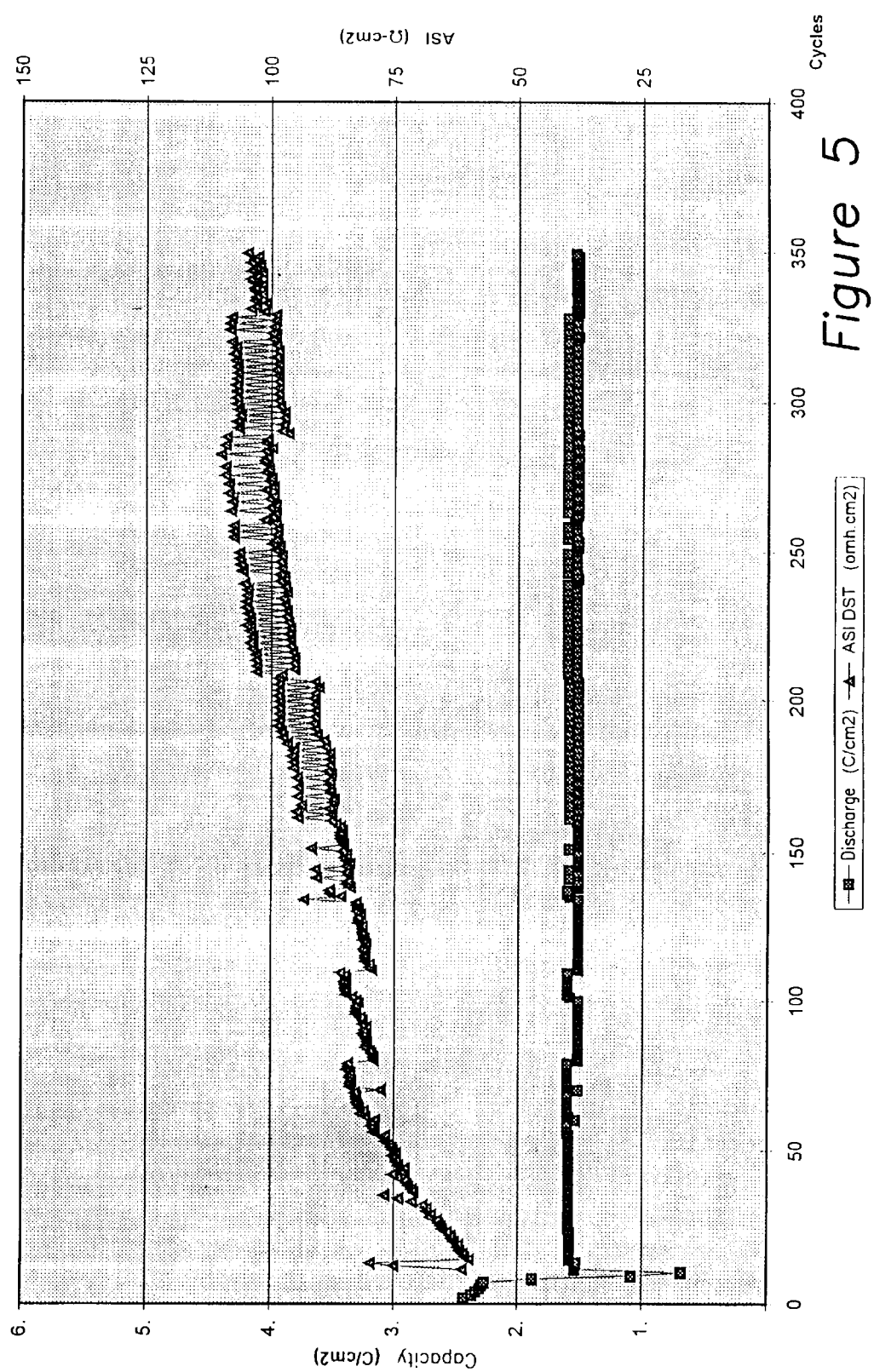
FIG. 5 shows the cycling results of an electrochemical generator including a composite electrode with double solid electrolytes, the electrode being coated on a non protected aluminum collector according to the invention.

In this example, the composite cathode including a double electrolyte of example 3 is used for producing an electrochemical generator according to the following steps. To the assembly collector/composite cathode with double solid electrolyte of example 3 there is joined, by a process of heat transfer, a thin film about 15 microns consisting of a polymer electrolyte based on a copolymer of ethylene oxide containing the lithium salt LiTFSI at a concentration corresponding to a molar ratio O/Li of 30/1. The assembly collector/composite cathode/solid polymer electrolyte is thereafter mounted into a battery facing a lithium anode in excess, by a process of heat transfer. The reversible capacity of the composite cathode is 2.30 C/cm². FIG. 5 illustrates the behavior of this laboratory cell as a function of cycling at 60° C. It is observed that the capacity is well maintained during consecutive cycles which confirms that all the active material is readily accessible by either one of the solid electrolyte of the composite. It is also shown in FIG. 5 that the value of ASI (Are Specific Impedance) is maintained, which represents the sum of the phenomena of ohmic resistance, charge and diffusion transfer and thus, this enables to have an idea of the possibility to preserve the quality of the electrical contacts. In this example the ASI is about 100 Ω after more than three hundred and fifty (350) cycles.

Figure 6:
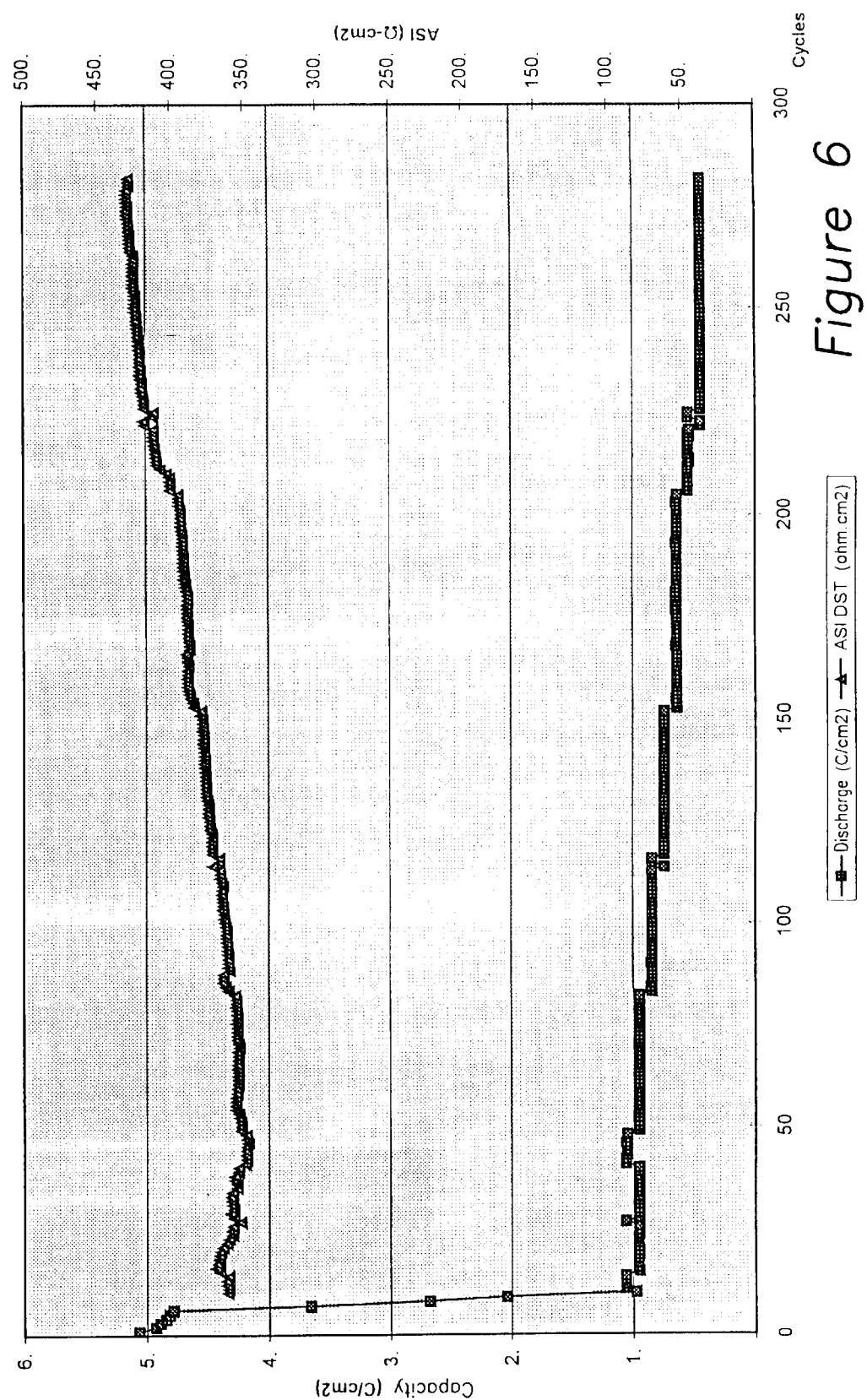
FIG. 6 shows the cycling results of an electrochemical generator including a composite electrode with solid polymer electrolyte coated on a non protected aluminum collector.

On the contrary, in FIG. 6, there is illustrated the behavior in cycling of a battery similar to the one of the preceding example except that the composite cathode with double solid electrolytes has been replaced by a composite cathode with simple polymer electrolyte. This latter cathode is prepared by coating a dispersion in acetonitrile of the following elements: copolymer based on ethylene oxide (55% volume) containing the salt LITFSI at a concentration corresponding to a molar ratio O/Li of 30, $V_2O_5$ powder (40%) and carbon black (Ketjen black, 5% volume), on a non protected aluminum collector. After coating, the film is dried under vacuum during 12 hours. This cathode is used for mounting a battery which operates at an elevated temperature of 60° C., opposite a lithium anode which has previously been laminated with a polymer electrolyte 15 microns acting as separator. The installed capacity of the battery is 4.80 C/cm². FIG. 6 shows an important loss of capacity and high ASI values already at the start of the cycling operation which is close to four times higher than that of the preceding test in which the battery had a cathode with double solid electrolyte (FIG. 5), thus illustrating the favorable influence of the embodiment of the invention on the value of the electrical contact resistance and of diffusion. This example establishes that the addition of a vitreous electrolyte of the type lithium polymetaphosphate enables to maintain the integrity of ionic and electronic exchanges between the interfaces collector/cathode and electrode/electrolyte materials. The lithium polymetaphosphate glass prevents localized phenomena of passivation and corrosion which decreases the capacity of the generator.

Example 5

In this example, a thin composite cathode with double solid electrolytes having a thickness of 15 microns is prepared according to the procedure described in example 3 except that vanadium oxide $V_2O_5$ is replaced with $LiFePO_4$. The composite cathode thus prepared in evaluated in cycling.

The thin composite cathode with double solid electrolyte based on $LiFePO_4$ is prepared in the following manner. 30 g of acid $(HPO_3)_n$ are dissolved in 300 g of water. The aqueous solution based on $((HPO_3)_n)$ is then partly or completely neutralized by adding lithium hydroxide monohydrate $(LiOH.H_2O)$, in a molar ratio $(HPO_3)_n/LiOH$ of 1, which corresponds to the addition of 15.8 g of $LiOH.H_2O$. To this solution, 253.5 g of an aqueous dispersion of conductive carbon black (Ketjenblack EC-600) containing 5% by weight of carbon black are strongly mixed with an aqueous solution of $(LiPO_3)_n$, and thereafter, 231 g of $LiFePO_4$ are added and dispersed. This dispersion is coated on an aluminum collector about 15 microns thick by means of a template. The thickness of the film thus obtained, after drying at 150° C. is close to 15 micrometers and the volumic composition of the dry film obtained consists of 77% $LiFePO_4$, 15% $LiPO_3$ and 8% carbon black. A portion of this pre-electrode is then spreaded with a solution containing a copolymer of molecular weight close to 50,000 g/mol, consisting for the major part of ethylene oxide units also including cross-linkable acrylate functions and propylene oxide monomers, with a lithium salt LiTFSI at a concentration corresponding to a molar ratio O/Li of 30. A liquid polar aprotic solvent such acetonitrile is used to facilitate coating with a template and the penetration of the polymer into the porous electrode. Drying under vacuum at 80° C. of the composite electrode enables not only to eliminate any residual solvent but also gives a better penetration of the polymer electrolyte.

The composite cathode including a double electrolyte is evaluated in an electrochemical cell prepared in the following manner. On the member collector/composite cathode with double solid electrolyte based on LiFePO4, there is placed by a process of heat transfer, a thin film about 15 microns consisting of a polymer electrolyte based on ethylene oxide containing a lithium salt at a concentration corresponding to a molar ratio O/Li of 30/1. The member collector/composite cathode/solid polymer electrolyte is then mounted into a battery opposite a lithium anode in excess by a process of heat transfer. The reversible capacity of the composite cathode is close to 1 C/cm$^2$. When cycled at 80° C., this battery shows an initial utilization corresponding to the expected capacity of the cathode which confirms that all the active material is well accessible by either one of the solid electrolytes of the composite. It is also shown that the ASI (Area Specific Impedance) value is maintained, which represents the sum of the phenomena of ohmic resistance, charge transfer and diffusion and thus enables to evaluate the maintenance of the quality of the electrical contacts.

Example 6

In this example, the porous composite cathode with mineral binder is identical to the one prepared in example 4, except that the remaining porosity of the composite electrode is compensated by a polyether matrix which has been swollen with at least one aprotic solvent containing at least one alkali salt.

A generator is made by utilizing a porous mineral electrode of example 4 consisting of iron phosphate, (LiFePO$_4$) in a volumic fraction of 86%, carbon black (Ketjenblack EC-600) in a volumic fraction of 6% and a solid mineral electrolyte LiPO$_3$ in a volumic fraction of 8%. Said positive electrode has a capacity of 4.2 Coulombs/cm$^2$. The positive electrode with double solid electrolyte is prepared according to the procedure described in example 5. The porous negative electrode contains graphite in a volumic fraction of 82% and a vinyldiene co-hexafluoro propene fluoride polymer, in a volumic fraction of 12%. Said negative electrode has a capacity of 3.3 Coulombs/cm$^2$. The negative electrode is obtained by coating in solvent phase (acetone) on a copper current collector 18 $\mu$m thick. The gelled polymer electrolyte is prepared from a solution containing a volumic fraction of 80% of the mixture of solvent tetraethyl sulfamide (TESA) plus ethylene carbonate and lithium hexafluorophosphate at a 1 molar concentration (available from Tomyama) and a volumic fraction of 20% of glycerol-tri[poly(oxyethylene) (oxypropylene)] triacrylate polymer. This solution is thereafter spreaded on the anode and the mineral electrolyte cathode so as to compensate for the porosity of the two electrodes without leaving an excess on the surface of the electrodes. After having been soaked by spreading, the negative electrode and the positive electrode are irradiated with an electron beam, EB, at a rate of 5 Mrad so as to cross-link the glyceroltri[poly(oxyethylene)(oxypropylene) triacrylate polymer. The separator consists of a polymer membrane based on glyceroltri[poly(oxyethylene) (oxypropylene)] triacrylate polymer 15 $\mu$m thick containing lithium hexafluorophosphate (LiPF$_6$) in a molar ratio O/Li= 30. When assembling the electrochemical generator, the separator is immersed 30 minutes in a mixture of solvent tetraethyl sulfamide (TESA) plus ethylene carbonate (in a molar ratio 1:1) containing lithium hexafluorophosphate at a concentration of 1 molar. Following the immersion, the solvent holds 60% of the volume of the separator. The electrochemical generator is thereafter rapidly assembled by light pressing the negative electrode of the separator and the positive electrode at 25° C. and is placed in an impervious bag. After 54 cycles of deep discharge at C/6 and recharge at C/8, between voltage limits of 4.0 V and 2.5V. more than 80% of the capacity is always obtained.

We claim:

1. A composite electrode for an electrochemical cell, wherein said electrochemical cell comprises the composite electrode, a second electrode and one or more electrolyte acting as a separator, wherein the electrolyte is disposed between the composite electrode and the second electrode, said composite electrode comprising a current collector, dispersed particles of electrochemical active material, a first additive of electronic conduction and two or more solid electrolytes, a first solid electrolyte which is vitreous and mineral, and a second solid electrolyte which is an organic polymer electrolyte, wherein the vitreous mineral electrolyte wets part of the surface of the active material dispersed in the composite electrode, an additive of conduction, which is present therein, and the current collector so as to form a porous mineral sub-assembly, said surface having been wetted in part, thus being protected by an impervious mineral phase, the second solid electrolyte being in intimate contact with the porous mineral sub-assembly so as to ensure ionic exchanges within the composite electrode and with the other components of the cell, said second solid electrolyte additionally acting as deformable binder for the combination comprising the composite electrode, its collector and the separator of the cell, said composite electrode thereby ensuring zones where at least part of the exchange surfaces between solid phases and the vitreous mineral electrolyte is made non-accessible to the components of the organic polymer electrolyte and to contaminants which may originate from the other components of the electrochemical cell, said composite electrode therefore being less susceptible to be subject to the formation of passivation or degradation films, thereby ensuring electrical contacts within the composite electrode, in spite of adverse conditions of temperature, voltage or cycling within the cell.

2. The composite electrode according to claim 1, wherein the first additive of electronic conduction is selected from the group consisting of carbon black, graphite, metallic powder, doped conjugated polymer, nitride and carbide of transition metals.

3. The composite electrode according to claim 1, wherein said second electrolyte comprises a second additive of electronic conduction in dispersed form to optimize electronic exchanges within the composite electrode and its current collector.

4. The composite electrode according to claim 1, wherein the vitreous mineral electrolyte is selected from the group consisting of a phosphate of an alkali metal, a polyphosphate of an alkali metal, a borate of an alkali metal, a polyborate of an alkali metal, and mixtures thereof, which are conductive of alkali ions.

5. The composite electrode according to claim 4, wherein the alkali metal comprises lithium or potassium.

6. The composite electrode according to claim 1, wherein the vitreous mineral electrolyte comprises one or more glass forming element.

7. The composite electrode according to claim 6, wherein the glass forming element is selected from the group consisting of an organo-metallic, a silica, a siloxane, a hydrolyzed aluminate, and a hydrolyzed titanate.

8. The composite electrode according to claim 1, wherein the vitreous mineral electrolyte comprises lithium phosphate of a stoichiometry substantially corresponding to $LiPO_3$, wherein the pH ranges from 4 to 9, and wherein the minimum conductivity is $10^{-10}S.cm^{-1}$ at the temperature of operation of the electrochemical cell.

9. The composite electrode according to claim 8, wherein lithium phosphate is prepared by neutralization of metaphosphoric acid in solution with water and a lithium salt to give said pH range.

10. The composite electrode according to claim 1, wherein said electrode is a cathode comprising said electrochemical active material is selected from the group consisting of an oxide, a chalcogenide, an oxyanion derivative of a transition metal, and lithium, and mixtures thereof.

11. The composite electrode according to claim 1, wherein said electrode is a cathode comprising said electrochemical active material is based on vanadium oxide.

12. The composite electrode according to claim 1, wherein said electrode is a cathode comprising said electrochemical active material is based on a phosphate or a phosphosulfate of olivine structure of a transition metal comprising iron or manganese of Nasicon.

13. The composite electrode according to claim 12, wherein said phosphate is an iron phosphate of the formula $LiFePO_4$ in a discharged state.

14. The composite electrode according to claim 2, wherein the first additive of electronic conduction is metallic, and in a dispersed form.

15. The composite electrode according to claim 14, wherein the first additive of electronic conduction is either silver or copper.

16. The composite electrode according to claim 2, wherein the first additive of electronic conduction is semi-metallic, and in a dispersed form.

17. The composite electrode according to claim 16, wherein the first additive of electronic conduction is selected from the group consisting of a metal carbide, a metal nitride, and a metal boride.

18. The composite electrode according to claim 1, wherein the current collector comprises aluminum.

19. The composite electrode according to claim 1, wherein the current collector comprises copper.

20. The composite electrode according to claim 1, wherein the active material dispersed in the composite electrode is at a voltage lower than 1.6 volts with respect to that of metallic lithium, and wherein the active material operates as an anode.

21. The composite electrode according to claim 1, wherein the volumic fraction of the vitreous mineral electrolyte with respect to the dispersed phases of active material and of additives of electronic conduction ranges from about 2 to about 25% so as to permit partial wetting of the dispersed solid phases, the formation of an open porosity of the mineral sub-assembly, and the adherence of the vitreous mineral electrolyte to said collector before introducing the organic polymer electrolyte.

22. The composite electrode according to claim 21, wherein said open porosity ranges from about 30 to about 70%.

23. The composite electrode according to claim 1, wherein said organic polymer electrolyte comprises a soluble salt.

24. The composite electrode according to claim 23, wherein said soluble salt is a lithium salt.

25. The composite electrode according to claim 1, wherein said organic polymer electrolyte comprises a polyether comprising ethylene oxide units.

26. The composite electrode according to claim 1, wherein said organic polymer electrolyte comprises a gel comprised of a polyether matrix or a polyelectrolyte, a liquid aprotic solvent and a soluble salt.

27. The composite electrode according to claim 1, wherein said organic polymer electrolyte comprises a gel comprised of a non-solvating polymer matrix, a liquid aprotic solvent and a soluble salt.

28. An electrochemical cell comprising a composite electrode according to claim 1, a second electrode and one or more electrolyte, wherein said electrolyte comprises a separator which is disposed between the composite electrode and said second electrode, wherein said separator comprises a solid polymer electrolyte.

29. An electrochemical cell including a composite electrode according to claim 1, a second electrode and one or more electrolyte, wherein said electrolyte comprises a separator which is disposed between the composite electrode and said second electrode, wherein said separator comprises a polymer, an aprotic solvent and a dissociated lithium salt.

30. The electrochemical cell according to claim 29, wherein said polymer within the separator is a solvating polymer.

31. The electrochemical cell according to claim 29, wherein said polymer within the separator is a non-solvating polymer.

32. An electrochemical cell including a composite electrode according to claim 1, further comprising a second electrode and one or more electrolyte constituting a separator which is disposed between the composite electrode and said second electrode, wherein said separator comprises a solid powder bound by a vitreous mineral electrolyte impregnated with a liquid or polymer electrolyte, wherein the vitreous mineral electrolyte is selected from the group consisting of a phosphate of an alkali metal, a polyphosphate of an alkali metal, a borate of an alkali metal, a polyborate of an alkali metal, and mixtures thereof, which are conductive of alkali ions.

33. A process for preparing a composite electrode for an electrochemical cell, wherein said composite electrode comprises two locally distributed solid electrolytes, a first solid electrolyte being mineral and vitreous, a second solid electrolyte being an organic polymer electrolyte, as well as its collector, wherein an aqueous solution of the first electrolyte or its precursor in which particles of electrode material are dispersed, is prepared, the dispersion obtained is applied on a current collector and said dispersion is dried so as to wet and cover said particles and the current collector, and to form a porous mineral subassembly which adheres to the current collector to permit its handling in the form of a film, and introducing within the porous mineral sub-assembly the organic polymer electrolyte to serve as a deformable binder and mixed conductor within the porous sub-assembly, and to give the composite electrode.

34. The process according to claim 33, wherein the particles of electrode material comprise a first additive of electronic conduction in the aqueous solution of the first electrolyte.

35. The process according to claim 33, wherein the organic polymer electrolyte is introduced into the porous mineral sub-assembly in molten form.

36. The process according to claim 33, wherein the organic polymer electrolyte is introduced into the porous mineral sub-assembly in the form of a solution in a solvent.

37. The process according to claim 33, wherein the organic polymer electrolyte is introduced into the porous mineral sub-assembly in the form of low molecular weight prepolymer or monomer, which is thereafter cross-linked or polymerized.

38. The process according to claim 34, wherein the first additive of conduction is selected from the group consisting of carbon black, graphite, a metallic powder of a semi-metallic compound based on a metal carbide, a metal nitride, a metal boride and a metal silicide.

39. The process according to claim 33, further comprising applying a dispersion of a second additive of electronic conduction in an organic polymer electrolyte containing a lithium salt on the film of the porous mineral sub-assembly before introducing the polymer electrolyte within the porous mineral sub-assembly.

40. The process according to claim 33, wherein the particles of electrode material are selected from the group consisting of an oxide, a chalcogenide, a phosphate of olivine structure, and a Nasicon including phosphate or sulfate anions.

41. The process according to claim 34, further comprising a volumic fraction of mineral electrolyte comprising 2 to 25% with respect to the volume of the electrode material and the additives of electronic conduction, and the porous mineral subassembly is formed so that its porosity ranges from about 30 to about 70%.

42. The process according to claim 34, wherein the mineral electrolyte, is vitreous and impervious to the components of the organic polymer electrolyte, and is selected from the group consisting of a phosphate of an alkali metal, a polyphosphate of an alkali metal, a borate of an alkali metal, and a polyborate of an alkali metal, and mixtures thereof.

43. The process according to claim 42, wherein the alkali metal comprises of lithium or potassium.

44. The process according to claim 34, wherein the mineral electrolyte comprises one or more glass forming element.

45. The process according to claim 44, wherein the glass forming element is selected from the group consisting of an organo-metallic, a silica, a siloxane, a hydrolyzed aluminate, and a hydrolyzed titanate.

46. The process according to claim 34, wherein the mineral electrolyte comprises lithium phosphate of stoichiometry substantially corresponding to $LiPO_3$.

47. The process according to claim 34, wherein the organic electrolyte is a solvating polymer.

48. The process according to claim 34, wherein the organic electrolyte is a non-solvating polymer.

49. The process according to claim 34, wherein the organic electrolyte is a gelled polymer.

50. The process according to claim 34, wherein the organic electrolyte is a non-gelled polymer.

51. The process according to claim 47, wherein the polymer comprises a polar aprotic solvent and a dissolved lithium salt.

52. The process according to claim 34, wherein the organic polymer electrolyte comprises a polyether comprising ethylene oxide units.

53. A process for preparing a half-cell, comprising preparing an aqueous solution of a mineral electrolyte or its precursor, wherein particles of electrode material and an additive of electronic conduction are dispersed, applying the dispersion obtained therein on a current collector and drying said dispersion so as to wet and cover said particles and the current collector, and to form a porous mineral composite sub-assembly which adheres to the current collector so as to permit its handling in the form of film, preparing a dispersion of a mineral powder in another aqueous solution of the mineral electrolyte or its precursor, and applying the dispersion on the porous mineral composite sub-assembly so as to form a porous half-cell including the collector, the mineral composite sub-assembly and a porous mineral separator, and applying a polymer electrolyte containing lithium on the porous half-cell so as to introduce the polymer electrolyte, the latter then serving as binder and conductor within the porous mineral composite—porous mineral separator sub-assembly, thereby forming a double solid electrolyte half-cell.

54. The process according to claim 53, wherein the mineral powder is selected from the group consisting of an insulating oxide and an insulating solid, which are conductive of lithium ions.

55. The process according to claim 54, wherein the mineral powder is a Nasicon.

56. A process for preparing a half-cell wherein a polymer electrolyte separator is applied on a composite electrode according to claim 1.

57. The process according to claim 56, wherein the polymer electrolyte separator is loaded with one or more mineral powder which is conductive or non-conductive of lithium ions.

58. The process according to claim 56, wherein the polymer electrolyte separator is applied by pressing under hot conditions, in the form of molten liquid phase, in dissolved form, or as prepolymer.

59. A process for manufacturing an electrochemical cell, comprising assembling a composite electrode with a separator, and adding a second electrode, wherein said composite electrode comprising a current collector, dispersed particles of electrochemical active material, a first additive of electronic conduction and two or more solid electrolytes, a first solid electrolyte which is vitreous and mineral, and a second solid electrolyte which is an organic polymer electrolyte, wherein the vitreous mineral electrolyte wets part of the surface of the active material dispersed in the composite electrode, an additive of conduction, which is present therein, and the current collector so as to form a porous mineral sub-assembly, said surface having been wetted in part, thus being protected by an impervious mineral phase, the second solid electrolyte being in intimate contact with the porous mineral sub-assembly so as to ensure ionic exchanges within the composite electrode and with the other components of the cell, said second solid electrolyte additionally acting as deformable binder for the combination comprising the composite electrode, its collector and the separator of the cell, said composite electrode thereby ensuring zones where at least part of the exchange surfaces between solid phases and the vitreous mineral electrolyte is made non-accessible to the components of the organic polymer electrolyte and to contaminants which may originate from the other components of the electrochemical cell, said composite electrode therefore being less susceptible to be subject to the formation of passivation or degradation films, thereby ensuring electrical contacts within the composite electrode, in spite of adverse conditions of temperature, voltage or cycling within the cell, and wherein said separator comprises a polymer, an aprotic solvent and a dissociated lithium salt.

60. The process according to claim 59, wherein the second electrode is a composite electrode.

61. The process according to claim 59, wherein the composite electrode is a cathode based on vanadium oxide or transition metal phosphate of olivine structure, wherein the collector is aluminum.

62. The process according to claim 59, wherein the second electrode is a lithium anode.

63. The composite electrode according to claim 3, wherein the second additive of electronic conduction is selected from the group consisting of carbon black and graphite.

64. The process according to claim 39, wherein the second additive of conduction is selected from the group consisting of carbon black and graphite.

65. The composite electrode according to claim 32, wherein the alkali metal comprises lithium or potassium.

66. The composite electrode according to claim 32, wherein the vitreous mineral electrolyte comprises one or more glass forming element.

67. The composite electrode according to claim 66, wherein the glass forming element is selected from the group consisting of an organo-metallic, a silica, a siloxane, a hydrolyzed aluminate, and a hydrolyzed titanate.

68. The composite electrode according to claim 32, wherein the vitreous mineral electrolyte comprises lithium phosphate of a stoichiometry substantially corresponding to $LiPO_3$, wherein the pH ranges from 4 to 9, and wherein the minimum conductivity is $10^{-10} S.cm^{-1}$ at the temperature of operation of the electrochemical cell.

69. The composite electrode according to claim 68, wherein lithium phosphate is prepared by neutralization of metaphosphoric acid in solution with water and a lithium salt to give said pH range.

70. The process according to claim 48, wherein the polymer comprises a polar aprotic solvent and a dissolved lithium salt.

71. The process according to claim 49, wherein the polymer comprises a polar aprotic solvent and a dissolved lithium salt.

72. The process according to claim 50, wherein the polymer comprises a polar aprotic solvent and a dissolved lithium salt.

* * * * *